Oct. 22, 1929.    C. P. WEST    1,732,823
METERING SYSTEM
Filed Dec. 9, 1927    3 Sheets-Sheet 1

INVENTOR
Charles P. West.
BY
ATTORNEY

Oct. 22, 1929.   C. P. WEST   1,732,823
METERING SYSTEM
Filed Dec. 9, 1927   3 Sheets-Sheet 2

INVENTOR
Charles P. West.
BY
ATTORNEY

Oct. 22, 1929.  C. P. WEST  1,732,823
METERING SYSTEM
Filed Dec. 9, 1927   3 Sheets-Sheet 3

INVENTOR
*Charles P. West.*
BY
*[signature]*
ATTORNEY

Patented Oct. 22, 1929

1,732,823

UNITED STATES PATENT OFFICE

CHARLES P. WEST, OF PITTSBURGH, PENNSYLVANIA, ASSIGNOR TO WESTINGHOUSE ELECTRIC & MANUFACTURING COMPANY, A CORPORATION OF PENNSYLVANIA

METERING SYSTEM

Application filed December 9, 1927. Serial No. 238,813.

This invention pertains to systems for indicating, at a distance, the value of a direct or alternating current. Such systems may also be utilized in connection with automatic generating stations or automatic substations to indicate the value of the current in the various portions of the system at a central point.

One object of my invention is to provide a metering system having no moving parts except the indicator.

Another object of my invention is to devise a system which shall give an immediate indication of changes in the current to be measured.

A further object is to arrange a system so that the indication may be transmitted over a pair of conductors in a telephone cable which may be used simultaneously for communication purposes.

Another object is to provide a system in which one of the conductors used for transmitting the indication may also be employed in common with a supervisory control circuit.
Another object of my invention is to provide a system for metering which shall give an accurate indication of the current to be measured.

Other objects will appear from a further description of my invention.

For a better understanding of my invention, reference should be had to the accompanying drawings which illustrate several modifications thereof.

Figure 1 is a diagram illustrating a simple system of metering as applied to the measurement of an alternating current.

Figs. 3, 4, 5 and 6 are diagrams illustrating still further modifications of my invention.

Figure 3:
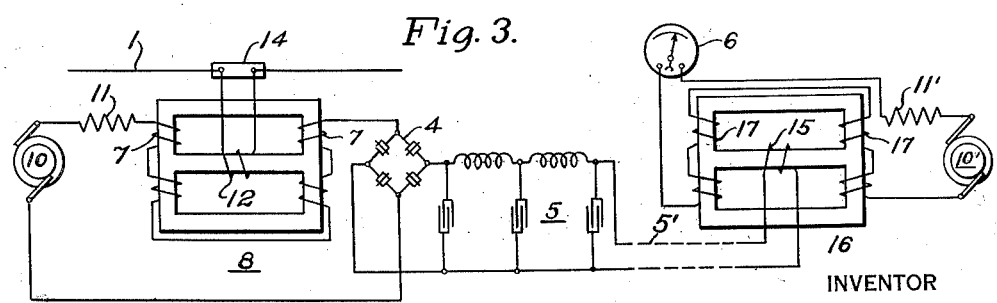
Figure 4:
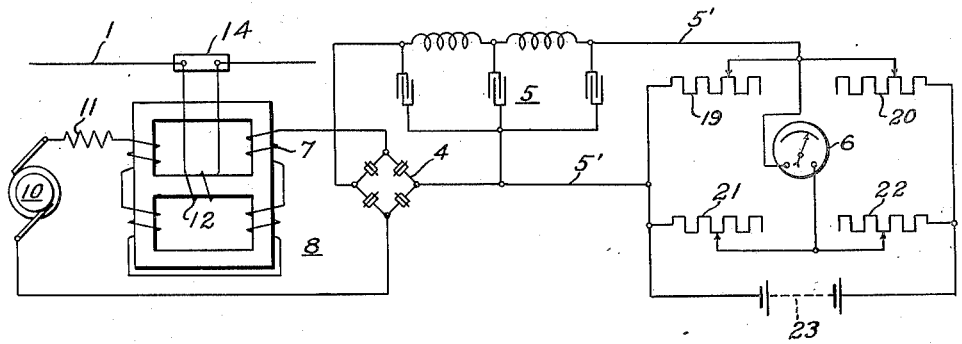
Figure 7:
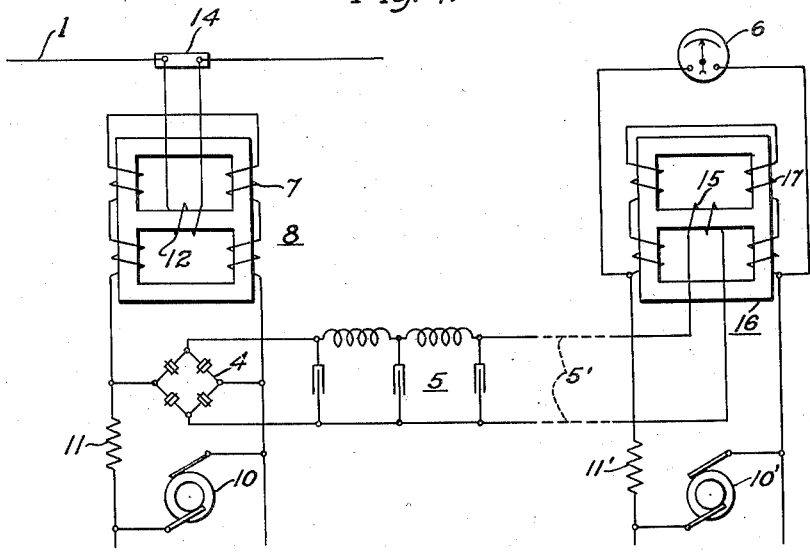
Figure 8:
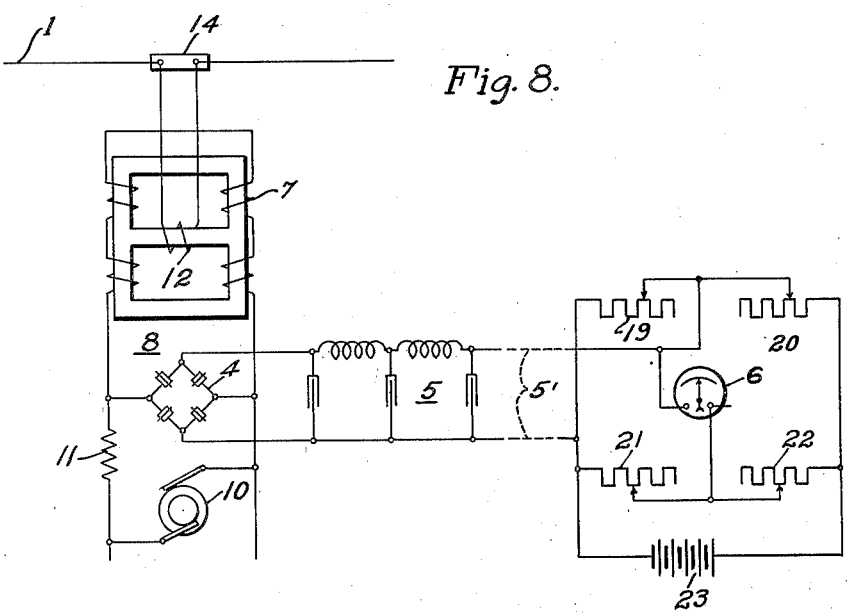

Figs. 7 and 8 are diagrams showing further modifications of the systems illustrated in Figs. 3 and 4.

Figure 1:
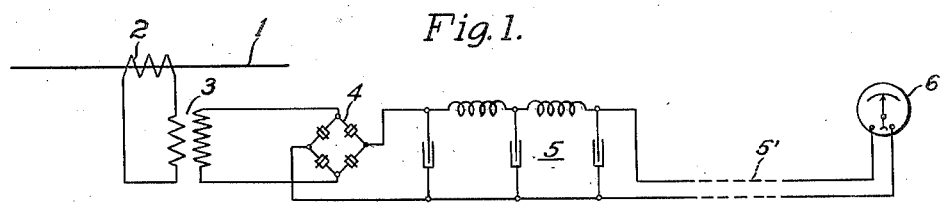
Figs. 1a and 1b are diagrams showing how my metering systems may be combined with telephone and supervisory-control circuits, respectively.

In Fig. 1, the conductor carrying the alternating current to be measured is indicated at 1. A current transformer 2, connected to the conductor 1, supplies current to a local circuit including a transformer 3 and a rectifier 4 which is illustrated as a copper-oxide-disc rectifier, although it may be of any suitable type. The output of the rectifier 4 is supplied to a filter circuit 5 and to a meter 6 by means of conductors 5′. The rectifier 4 is a full-wave bridge rectifier comprising four rectifying elements.

Figure 1A:
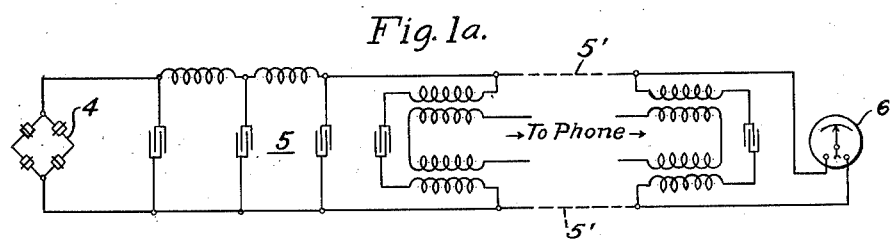
Figure 1B:
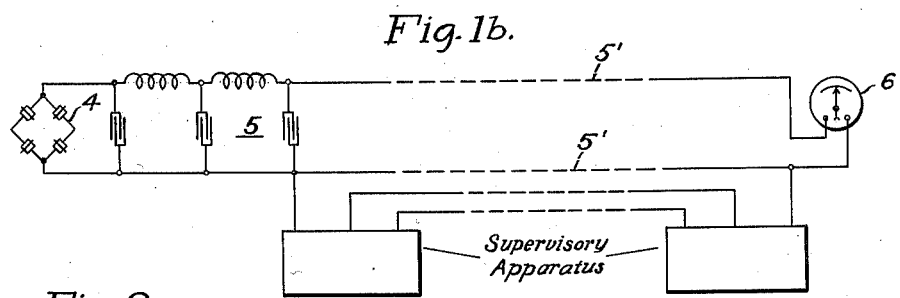

The operation of the system shown in Fig. 1 is obvious from the above description. Current in the local circuit including the transformer 3 and the rectifier 4 is, of course, proportional to the current in the conductor 1 which is the primary of the current transformer 2. Consequently, the output of the rectifier 4 which passes through the meter 6, is also proportional to the value of the current in conductor 1. The rectified current will have a constant ratio to the alternating current to be measured, and will not be affected by the resistance of the line conductors, within certain limits. In this manner, the flow of the current in conductor 1 is indicated by the meter 6 which may be placed at a distance from the conductor 1. The filter 5 is provided to make possible the use of a pair of conductors in a telephone cable for transmitting the indication of the value of the current in the conductor 1 to the meter 6. The conductors 5′ may be simultaneously utilized for communication, or one of the conductors 5′ may be used in common with the control circuit of a supervisory control system by means of well-known circuits, such as shown in Figs. 1a and 1b, respectively.

Figure 2:
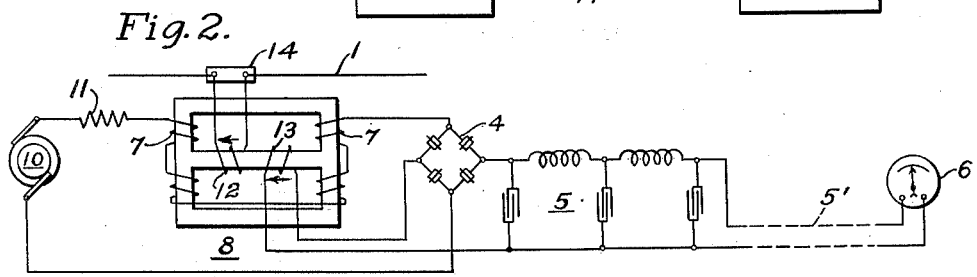
Fig. 2 is a diagram showing a further modification of my invention applied to the measurement of a direct current.

Fig. 2 illustrates a slightly different form of my invention which depends, for its operation, upon the well-known principle that the superposition of a unidirectional flux upon an alternating flux in a magnetic circuit, reduces the alternating-current impedance of the reactor, or increases the magnetizing current.

The conductor carrying the direct current to be measured is indicated at 1. A three-legged reactor 8 is provided, the windings of which are in series with a rectifying device

4, which is illustrated as consisting of copper-oxide-disc rectifiers. The reactor windings are energized from a constant-voltage, alternating-current source 10 through an impedance 11. The direct-current output of rectifier 4 passes through a winding 13 on the center leg of the reactor 8, through filter 5 and meter 6. An additional direct-current winding 12 is placed on the center leg of the transformer 8 and is energized in proportion to the current carried by the conductor 1, by means of a shunt 14. The windings 12 and 13 are so connected that their magnetomotive forces are additive, as indicated by the arrows.

Assuming that there is no current flowing in the conductor 1, the impedance of the reactor winding will be high, resulting in a small rectified current through the winding 13 and the meter 6. The winding 13, when energized, affects the impedance of the reactor to a slight extent only, since it consists of relatively few turns. A balanced condition is soon reached, under which a steady current flows through the winding 13 and the meter 6, which should then be calibrated to indicate zero current in the conductor 1.

Now, if current flows in the conductor 1, a proportional current will flow through the winding 12, the magnetomotive force of which aids that of the winding 13. The result of the energization of the winding 12 will be to increase the unidirectional flux in the core of the transformer 8. This causes the impedance of the reactor to decrease, resulting in an increased output from the rectifier 4. The action of the winding 13, the magnetomotive force of which is small, compared with that of the winding 12, is to magnify any change resulting from energization or deenergization of the winding 12. This increases the sensitivity of the system, although its operativeness is not affected by the omission of the winding 13. The increase of the current in the circuit including the rectifier 4 is reflected by a change in the indication of the meter 6, which should then be calibrated to indicate the current actually flowing in conductor 1. By continuing this process, the meter 6 may be calibrated to indicate, at all times, the exact value of the current to be measured.

In Fig. 3, is illustrated a further modification of my invention, which necessitates the use of two of the three-legged reactors described in connection with Fig. 2. As in the previous figures, 1 indicates the conductor carrying the direct current to be measured. A reactor 8 is provided with windings 7 which are energized in series with a rectifying device 4, from any suitable constant-voltage source 10 of alternating current. The direct current winding 12 on the center leg of the transformer is energized in proportion to the current to be measured.

The output of the rectifier 4, is supplied to the filter 5 and, through the conductors 5', to the direct-current winding 15 on the center leg of a second reactor 16. The windings 17 of the reactor 16 are in series with the meter 6 and the impedance 11'; the circuit being energized from any convenient constant-voltage, alternating-current source 10'.

If no current flows through the conductor 1, the impedance of the reactor 8 is high, and a small rectified current flows through the filter 5 to the direct-current winding 15 of reactor 16. This small current by inducing a low value of unidirectional flux, only slightly reduces the normally high impedance of the windings 17, so that very little current flows through meter 6. At this low value of current, the meter 6 may be calibrated to read zero.

If it is now assumed that a certain value of current flows through the conductor 1, the direct-current winding 12 of the reactor 8 is energized in proportion to the magnitude of that current. The energization of the winding 12 reduces the impedance of the reactor 8, thereby increasing its magnetizing current and the current supplied by the rectifier 4 to the direct-current winding 15 of the reactor 16. This results in an increased saturation of the core of the reactor 16, and a corresponding decrease in the impedance of said reactor. The lowering of the reactor impedance permits a greater current to flow in the meter circuit. The meter 6 should then be calibrated to indicate the magnitude of the current in conductor 1. In this way, the meter 6 may be calibrated to indicate the value of the current flowing in conductor 1 at all times.

Fig. 4 illustrates a further modification of my invention which also utilizes the three-legged reactor shown in the preceding figures. By means of the shunt 14, in the conductor 1, and the direct-current winding 12 of the reactor 8, the current output of the rectifier 4 is varied in accordance with the value of the current in conductor 1, the rectifier current varying directly as the current to be measured. The rectifier output is supplied to one arm 19 of a Wheatstone bridge composed of the resistors 19, 20, 21 and 22, the meter 6 and the battery 23.

When there is no current flowing in the conductor 1, the rectifier 4 will send a current through the arm 19 of the Wheatstone bridge. The other arms of the bridge are then adjusted so that the meter 6 reads zero.

If a current now passes through the conductor 1, the energization of the winding 12 will decrease the reactor impedance and increase the output of the rectifier 4, so that the Wheatstone bridge is no longer balanced and the meter registers an indication and may be calibrated in accordance with the value of the current in conductor 1. By continuing this process, the meter 6 may be calibrated for all values of current in the conductor 1.

Figure 5:
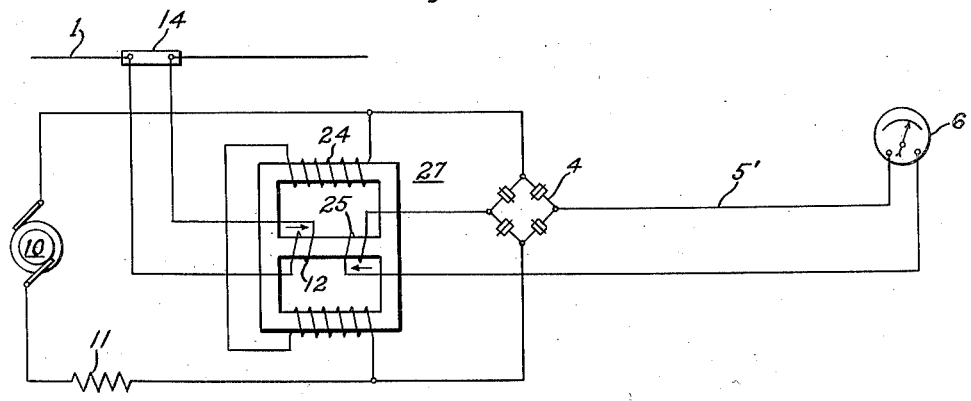

Fig. 5 illustrates a still further modification of this invention which is similar to that of Fig. 2, except that, in Fig. 5, the reactor and rectifier are connected in parallel to the alternating-current source, instead of in series, as in Fig. 2. The alternating current source 10 through the impedance 11 which is of a high value compared to that of the reactor and rectifier in parallel, supplies current to the winding 24 of a reactor 27 having an iron core, and a rectifier device 4, in parallel. The function of the impedance 11 is to prevent substantial variations in the current from the source 10. The operation of the system shown in Fig. 5 depends on a constant source of alternating current, but any equivalent constant-current source may be substituted for the generator 10 and impedance 11. The reactor 27 is provided with a direct-current winding 12, connected to a shunt 14 in the conductor 1, and also with a direct-current winding 25 connected in series with the rectifier 4 and the meter 6. The magnetomotive forces of the windings 25 and 12 are in opposition.

When the value of the current in conductor 1 is zero, the reactor core is saturated by the current in the winding 25, and the reactor impedance is low so that the rectifier current is small because most of the current from source 10 now passes through winding 24. The meter should be calibrated to indicate zero at this small current.

If a current now flows in the conductor 1, the winding 12 is energized, and, since its magnetomotive force opposes that of the winding 25, the result will be an increase in the reactance of the winding 24, because of the decrease in the unidirectional saturating flux in the reactor core. The increased reactance of the winding 24 causes a greater portion of the current from the alternating-current source 10 to pass through the rectifier 4. This, of course, results in an increased meter current, with a consequent change in the meter indication. After the meter 6 has been properly calibrated, it will accurately indicate any value of current in conductor 1.

Figure 6:
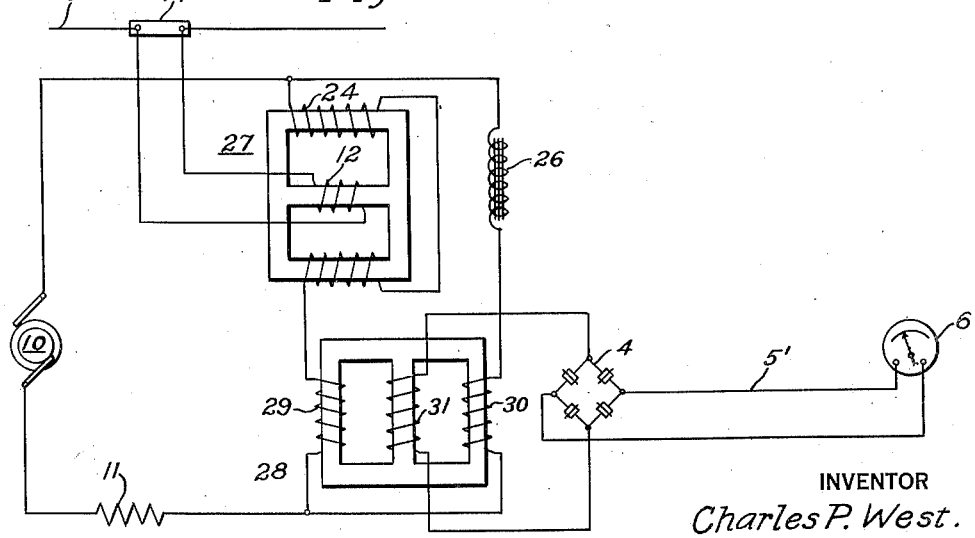

Fig. 6 illustrates a slightly different modification of my invention in which a reactor 27 and a reactor 26 are connected in parallel to an alternating-current source 10, the winding 24 of the reactor 27 being connected in series with a winding 29 of an additional reactor 28, while the reactance 26 is connected in series with a winding 30 of the reactor 28. The reactor 27 is provided with a direct-current winding 12 on the center leg thereof.

When no current is flowing in the conductor 1, the winding 12 is deenergized, and because of the design constants of the circuit, the current through the winding 24 of the reactor 27 and the winding 29 of the reactor 28 is equal to the current through the reactor 26 and the winding 30 of the reactor 28. Under this condition, no voltage will be induced in the winding 31 of the reactor 28 which is connected to the rectifier 4. This is because of the fact that the windings of the reactor 28 are so arranged that, when equal currents flow through the windings 29 and 30, the net alternating flux in the center leg of the core is zero, no voltage is induced in the winding 31, and, therefore, no current is supplied by the rectifier 4 to the meter 6.

When a current passes through conductor 1, however, the resulting energization of the winding 12 decreases the reactance of the winding 24 by saturating the core of the reactor 27 with a unidirectional flux. A greater current, therefore, flows through the winding 24 of the reactor 27 than through the reactor 26, and the unbalance of the magnetomotive force of the windings 29 and 30 sets up a resultant flux in the center leg of the core of the reactor 28. This resultant flux induces a voltage in the winding 31, which by means of the rectifier 4, causes the meter 6 to be actuated to give an indication of the current in the conductor 1.

Although the modifications of Figs. 2 to 6, inclusive, have been described in connection with the metering of a direct current, it is obvious that the same systems are equally applicable to the indication of alternating currents. To adapt the systems described for such application, it is merely necessary to substitute for the shunt 14, a current transformer connected to the conductor carrying the current to be measured, as illustrated in Fig. 1, and a rectifier, the rectifier being connected to the winding 12 to energize it by direct current in proportion to the alternating current to be measured. It is also obvious that the meter 6 may be a direct-current instrument, as in Figs. 1, 2, 4, 5, 6 and 8, or may be actuated by alternating current, as in Figs. 3 and 7, in which the rectifier is omitted from the meter circuit.

Although Figs. 5 and 6 do not illustrate filters such as are shown at 5 in the preceding figures, such filters should be employed if telephone circuits are utilized to transmit indications of the current under observation, in order to prevent interference with neighboring communication circuits.

Fig. 7 is a diagram of a still further modification of my invention which is similar to that shown in Fig. 3, except that the reactor 8 and rectifier 4 are connected in parallel to the alternating-current source 10. All of the elements of the circuit of Fig. 7 are identical with those of Fig. 3. The meter 6, however, is connected in parallel to the winding 17 of the reactor 16.

When no current flows in the conductor 1, the impedance of the winding 7 is a maximum and most of the current from the source 10 passes through the rectifier 4 and thence through the winding 15. The energization of the winding 15 reduces the impedance of the winding 17 by saturating the core of the reactor 16. The reduction in the impedance of the winding 17 causes most of the current from the source 10′ to pass through the winding, and, consequently, very little current passes through the meter. The meter should be calibrated to read zero for this value of current.

When a current flows in the conductor 1, however, the winding 12, being energized, reduces the impedance of the winding 7 so that most of the current from the source 10 passes through the winding and very little through the rectifier 4. Under these conditions, the winding 15 is but slightly energized, and the winding 17 of the reactor 16 has its normal high impedance. Because of the high impedance of the winding 17, under these conditions, a large current passes through the meter 6 which may then be calibrated to read the value of the current in the conductor 1.

Fig. 8 illustrates another modification of my invention which is similar to that shown in Fig. 4, except that, like Fig. 7, the rectifier and reactor in Fig. 8 are connected in parallel to the source of alternating-current instead of in series therewith, as in Fig. 4.

When the current in the conductor 1 is zero, the direct-current output of the rectifier 4 is large, because of the high impedance of the winding 7. Under these conditions, the bridge composed of the resistors 19, 20, 21 and 22 is so adjusted that the meter 6 indicates zero.

When current passes through the conductor 1, however, the energization of the winding 12 reduces the impedance of the winding 7, saturating the core of the reactor 8, and the output of the rectifier 4 is decreased. This decrease in the output of rectifier 4 is effective to unbalance the bridge circuit, and the meter 6 gives an indication which may be calibrated to agree with the value of the current in conductor 1.

The impedance 11 in Figs 7 and 8, should have a high value, compared to the combined impedance of the rectifier and reactor, so that a substantially constant current is obtained from the source 10. When the rectifier and reactor are in series, as in Figs. 2, 3 and 4, the source 10 must be a constant-voltage source. In these systems, the meter current is changed by altering the voltage across the rectifier whereas, in Figs 5, 7 and 8, the current through the rectifier is varied in accordance with the current to be measured, to vary the meter indication.

I claim as my invention:

1. A metering system for indicating the value of a current comprising a rectifier and an impedance connected in series to an alternating-current source, a meter energized by the output of said rectifier and means for varying the effective value of said impedance in proportion to the current to be measured, whereby the current in said rectifier and meter will be varied in the same proportion.

2. A metering system for indicating the value of a current comprising an iron-core reactance and a rectifier connected in series to an alternating-current source, direct-current windings on the core of said reactance to vary the effective value thereof, one of said windings being energized by a portion of the current to be measured and the other by the output of said rectifier, and a meter connected in series with said rectifier and said second direct-current winding.

3. The method of measuring and indicating the value of a current which consists in varying the effective value of a reactance connected in series with a rectifier to an alternating-current source in proportion to the value of the current to be measured and energizing a meter by the output of said rectifier.

In testimony whereof, I have hereunto subscribed my name this 5th day of December, 1927.

CHARLES P. WEST.